United States Patent
Shimizu

(10) Patent No.: US 10,075,604 B2
(45) Date of Patent: Sep. 11, 2018

(54) ROTATION-ANGLE DETECTION DEVICE AND METHOD, AND IMAGE PROCESSING APPARATUS

(71) Applicant: Fumihiro Shimizu, Kanagawa (JP)

(72) Inventor: Fumihiro Shimizu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 8 days.

(21) Appl. No.: 14/315,614

(22) Filed: Jun. 26, 2014

(65) Prior Publication Data
US 2015/0009517 A1    Jan. 8, 2015

(30) Foreign Application Priority Data

Jul. 3, 2013    (JP) ................ 2013-140140

(51) Int. Cl.
*G01B 7/30* (2006.01)
*H04N 1/00* (2006.01)
(Continued)

(52) U.S. Cl.
CPC ......... *H04N 1/00904* (2013.01); *G01D 5/145* (2013.01); *G01D 3/02* (2013.01)

(58) Field of Classification Search
CPC .......... H04N 1/00904; H04N 1/00912; H04N 2201/0094; G01D 5/145; G01D 5/12; G01D 3/02
(Continued)

(56) References Cited

U.S. PATENT DOCUMENTS

| | | | | |
|---|---|---|---|---|
| 3,886,424 A | * | 5/1975 | Hoshina | G05B 19/231 318/604 |
| 4,579,122 A | * | 4/1986 | Shimizu | G01N 29/0645 600/445 |

(Continued)

FOREIGN PATENT DOCUMENTS

| | | |
|---|---|---|
| JP | 2010-217150 | 9/2010 |
| JP | 2013-101000 | 5/2013 |
| JP | 2013-108971 A | 6/2013 |

OTHER PUBLICATIONS

Partial Japanese Office Action dated Jun. 6, 2017, issued in corresponding Japanese Application No. 2013-140140. English translation has not been provided.

*Primary Examiner* — Neil R McLean
*Assistant Examiner* — Darryl V Dottin
(74) *Attorney, Agent, or Firm* — Harness, Dickey & Pierce, P.L.C.

(57) ABSTRACT

According to an embodiment of the present invention, a rotation-angle detection device for detecting a rotation angle of a rotor includes: plural rotation detectors that output detection signals which vary with the rotation angle of the rotor; a rotation calculator that outputs a rotated vector by rotating a vector expressed by the detection signals; an amplitude detector that outputs an amplitude signal indicating amplitude of the detection signals by performing computation on at least one of signals expressing the rotated vector using a predetermined target amplitude; a drive-power adjuster that adjusts the amplitude of the detection signals by changing drive power applied to the rotation detectors according to the amplitude signal; a corrector that corrects the amplitude based on the amplitude signal and outputs a corrected detection signal; and a rotation angle detector that detects a rotation angle of the rotor based on the corrected detection signal.

14 Claims, 10 Drawing Sheets

(51) Int. Cl.
*G01D 5/14* (2006.01)
*G01D 3/02* (2006.01)

(58) Field of Classification Search
USPC .......................................................... 358/1.13
See application file for complete search history.

(56) References Cited

U.S. PATENT DOCUMENTS

| | | | | |
|---|---|---|---|---|
| 4,779,243 | A * | 10/1988 | West | B06B 1/0261 367/137 |
| 5,990,642 | A * | 11/1999 | Park | H02P 6/185 318/400.04 |
| 2010/0156330 | A1* | 6/2010 | Inoue | B60L 11/14 318/400.02 |
| 2013/0099708 | A1* | 4/2013 | Shimizu | H02P 21/146 318/400.39 |
| 2014/0347040 | A1* | 11/2014 | Kawase | G01D 5/2448 324/207.12 |

* cited by examiner

FIG.2
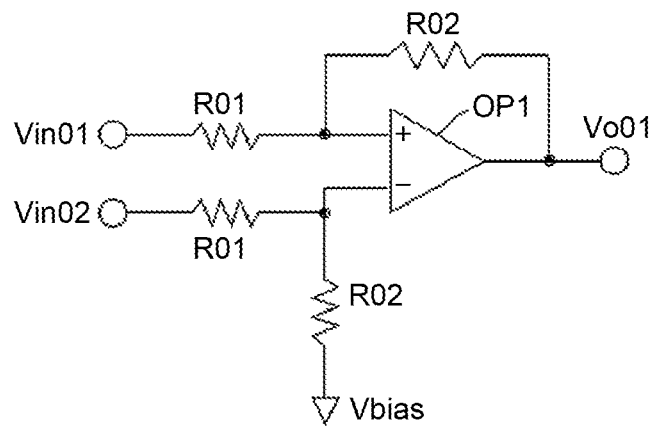
FIG.3
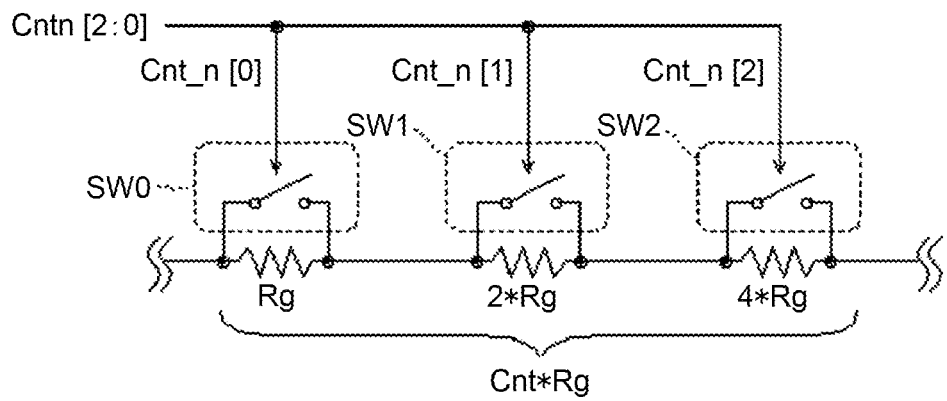
FIG.4
| Cnt [x] | 1 | 0 |
|---|---|---|
| SWITCH STATE | OFF | ON |

ROTATION-ANGLE DETECTION DEVICE AND METHOD, AND IMAGE PROCESSING APPARATUS

CROSS-REFERENCE TO RELATED APPLICATIONS

The present application claims priority to and incorporates by reference the entire contents of Japanese Patent Application No. 2013-140140 filed in Japan on Jul. 3, 2013.

BACKGROUND OF THE INVENTION

1. Field of the Invention

The present invention relates generally to rotation-angle detection devices and methods and image processing apparatuses and, more particularly, to rotation-angle detection devices and methods and image processing apparatuses configured to detect a rotation angle of a rotor accurately with an inexpensive structure.

2. Description of the Related Art

In image processing apparatuses such as printers, facsimiles, copiers, scanners, and multifunction peripherals (MFPs), drive mechanism is driven by drive motor to thereby drive each element involved in image processing, such as an image reading operation or an image forming operation, at a predetermined speed.

In a conventional technique for rotating a rotor such as a drive motor at a desired rotation speed, a rotation angle of the rotor on which a permanent magnet is arranged is detected as follows. A magnetic sensor, the output signal of which sinusoidally varies with the rotation angle of the rotor is arranged near an outer circumference of the rotor. A rotation-angle detection device detects the rotation angle of the rotor based on the output signal of the magnetic sensor. More specifically, a magnetic sensor such as a Hall element is used as the magnetic sensor. The rotation-angle detection device detects the rotation angle of the rotor based on the output signal of the magnetic sensor using a sequential search algorithm.

A conventional technique to this end is disclosed in Japanese Laid-open Patent Application No. 2010-217150 as an angle detection device which receives output signals from at least one pair of Hall elements, each pair of which is arranged perpendicular to each other, and obtains a detected rotation angle of a value which depends on an angular displacement from a reference position in a magnetic field. The angle detection device includes: a $\Delta\Sigma$ modulation unit which performs $\Delta\Sigma$ modulation of the output signals of the Hall elements based on a reference signal; a gain control loop which controls the reference signal fed to the $\Delta\Sigma$ modulation unit so that a root sum square of signals output from the $\Delta\Sigma$ modulation falls within a predetermined range; a storage unit which stores sine function values and cosine function values of plural angles; an angle detection loop which controls a sine function value and a cosine function value of a specified angle output from the storage unit so as to zero an angle error signal calculated from the signals output from the $\Delta\Sigma$ modulation unit and the sine function value and the cosine function value, and obtains a detected angle output based on the sine function value and the cosine function value.

This conventional technique is aimed at making highly-accurate angle detection possible while allowing flexible arrangement of the magnets and the Hall elements by configuring the angle detection device to include the $\Delta\Sigma$ modulation unit, the gain control loop, the storage unit, and the angle detection loop. The angle detection loop controls a sine function value and a cosine function value of a specified angle so as to zero an angle error signal which is calculated from a result of $\Delta\Sigma$ modulation of output signals of the Hall elements based on a gain-controlled reference signal, and the sine function value and the cosine function value, and obtains a detected angle output based on the controlled sine function value and cosine function value.

However, the conventional technique disclosed in Japanese Laid-open Patent Application No. 2010-217150 is disadvantageous in that building the angle detection device including the $\Delta\Sigma$ modulation unit, the gain control loop, the storage unit, and the angle detection loop is expensive.

Under the circumstances, there is a need to provide a technique for detecting a rotation angle of a rotor accurately with an inexpensive structure.

It is an object of the present invention to at least partially solve the problem in the conventional technology.

SUMMARY OF THE INVENTION

It is an object of the present invention to at least partially solve the problems in the conventional technology.

According to the present invention, there is provided a rotation-angle detection device for detecting a rotation angle of a rotor, the rotation-angle detection device comprising: plural rotation detectors configured and arranged to output two or more detection signals, the detection signals varying sinusoidally with the rotation angle of the rotor and differing from each other in phase, and amplitude of the detection signals varying with magnitude of drive power applied to the rotation detectors; a rotation calculator configured to output a rotated vector by rotating a vector expressed by the two or more detection signals; an amplitude detector configured to output an amplitude signal indicating amplitude of the detection signals by performing computation on at least one of signals expressing the rotated vector using a predetermined target amplitude; a drive-power adjuster configured to adjust the amplitude of the detection signals by changing the drive power applied to the rotation detectors according to the amplitude signal; a corrector configured to correct the amplitude of the detection signals based on the amplitude signal and output a corrected detection signal; and a rotation angle detector configured to detect a rotation angle of the rotor based on the corrected detection signal.

The present invention also provides an image processing apparatus comprising: a rotor; a drive mechanism for various types of image processing, the drive mechanism being to be driven by rotation of the rotor; and a rotation-angle detecting unit configured to detect a rotation angle of the rotor so that rotation of the rotor is controlled.

In the above-mentioned image processing apparatus, the rotation-angle detecting unit comprises; plural rotation detectors configured and arranged to output two or more detection signals, the detection signals varying sinusoidally with the rotation angle of the rotor and differing from each other in phase, and amplitude of the detection signals varying with magnitude of drive power applied to the rotation detectors, a rotation calculator configured to output a rotated vector by rotating a vector expressed by the two or more detection signals, an amplitude detector configured to output an amplitude signal indicating amplitude of the detection signals by performing computation on at least one of signals expressing the rotated vector using a predetermined target amplitude, a drive-power adjuster configured to adjust the amplitude of the detection signals by changing the drive power applied to the rotation detectors according to the amplitude signal, a corrector configured to correct the amplitude of the detection signals based on the amplitude signal and output a corrected detection signal, and a rotation angle detector configured to detect a rotation angle of the rotor based on the corrected detection signal.

The present invention also provides a rotation-angle detection method for detecting a rotation angle of a rotor, the rotation-angle detection method comprising: performing rotation calculation to output a rotated vector by rotating a vector expressed by two or more detection signals output from plural rotation detectors configured and arranged to output detection signals, the detection signals varying sinusoidally with the rotation angle of the rotor and differing from each other in phase, and amplitude of the detection signals varying with magnitude of drive power to the rotation detectors; performing amplitude detection to output an amplitude signal indicating amplitude of the detection signals by performing computation on at least one of signals expressing the rotated vector using a predetermined target amplitude; adjusting the amplitude of the detection signals by changing the drive power according to the amplitude signal; correcting including correcting the amplitude of the detection signals based on the amplitude signal and outputting a corrected detection signal; and detecting a rotation angle of the rotor based on the corrected detection signal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a circuit diagram of a subtractor;

FIG. 3 is a circuit diagram of a resistance-switchable resistor;

FIG. 4 is a diagram illustrating relationship between amplification factor count and switch state;

DETAILED DESCRIPTION OF THE PREFERRED EMBODIMENTS

Preferred embodiments of the present invention are described in detail below with reference to the accompanying drawings. Although the presently preferred embodiments of the present invention are described with various technically preferred limitations, the scope of the invention should not be construed as limited by the embodiments discussed below. It should not be construed that all of elements of the embodiments discussed below are essential to the invention unless specifically stated as such.

First Embodiment

Figure 1:
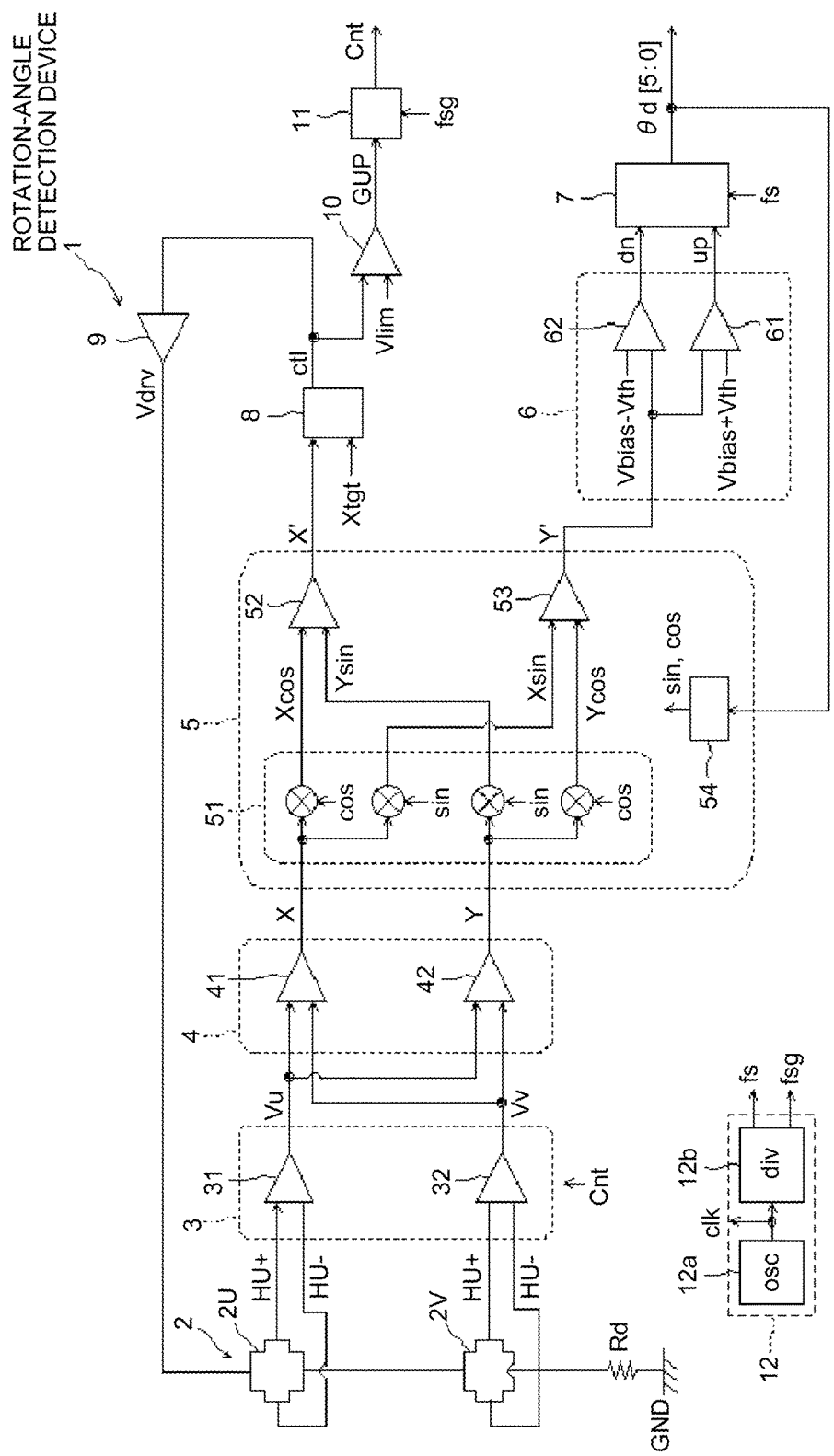
FIG. 1 is a circuit diagram of a rotation-angle detection device according to a first embodiment of the present invention.

FIGS. 1 to 14 are diagrams explaining rotation-angle detection methods and devices, and an image processing apparatus according to a first embodiment of the present invention. FIG. 1 is a circuit diagram of a rotation-angle detection device 1 according to the first embodiment.

Referring to FIG. 1, the rotation-angle detection device 1 includes a rotation detecting unit 2, a differential unit 3, a vector generation unit 4, a rotation calculating unit 5, a sign determining unit 6, an angle search unit 7, a control unit 8, a drive amplifier 9, a threshold-value detecting unit 10, a gain counter 11, and a clock generating unit 12.

The rotation detecting unit 2 includes two Hall elements (rotation detectors), which are Hall elements 2U and 2V. Each of the Hall elements 2U and 2V is attached to a rotor to detect a rotation angle of the rotor, which is a detection target. Examples of the rotor include a rotating shaft of a brushless DC motor. The Hall elements 2U and 2V are similar in configuration to each other and arranged to have a phase difference of 120 degrees.

The rotation-angle detection device 1 and the rotor may preferably be applied to an image processing apparatus such as an MFP. A drive mechanism of the image processing apparatus is coupled to the rotor.

The Hall element 2U and 2V, each having two pairs of terminals, are stationarily placed at predetermined positions near the rotor. The Hall elements 2U and 2V receive, at one of the two pairs of terminals, a drive signal (drive power) Vdrv applied from the drive amplifier 9. The drive signal Vdrv will be described later. The Hall elements 2U and 2V output a U-phase differential signal pair HU+/HU− and a V-phase differential signal pair HV+/HV− (detection signals), respectively, which vary with a magnetic field of the rotor.

The difference between the U-phase differential signal pair HU+/HU− is a signal having a sine waveform with respect to the rotation angle θ of the rotor expressed by the upper one of Equations (1) below. The difference between the V-phase differential signal pair HV+/HV− is a signal having a sine waveform with respect to the rotation angle θ of the rotor expressed by the lower one of Equations (1) below.

$$Vu0 = (HU+) - (HU-) = Au0 * \sin\left(\theta + \frac{\pi}{3}\right) \quad (1)$$
$$Vv0 = (HV+) - (HV-) = Av0 * \sin\left(\theta - \frac{\pi}{3}\right)$$

As expressed by Equation (2) below, the amplitude of the difference between the U-phase differential signal pair HU+/HU− (hereinafter, sometimes referred to as "differential signal HU+, HU−") is proportional to a sensitivity coefficient Ku and the drive signal Vdrv fed from the drive amplifier 9. The sensitivity coefficient Ku is a constant which depends on the sensitivity of the Hall element 2U, the magnitude of the magnetic field produced by permanent magnet and the like.

$$Au0 = Ku * Vdrv \quad (2)$$

As expressed by Equation (3) below, the amplitude of the difference between the V-phase differential signal pair HV+/HV− (hereinafter, sometimes referred to as "differential signal HV+, HV−") is proportional to a sensitivity coefficient Kv and the drive signal Vdrv fed from the drive amplifier 9. The sensitivity coefficient Ku is a constant which depends on the sensitivity of the Hall element 2V, the magnitude of the magnetic field produced by the permanent magnet and the like.

$$Av0 = Kv * Vdrv \quad (3)$$

It is assumed that the two sensitivity coefficients, Ku and KV, are equal to each other (Ku=Kv).

The terminal pairs, on which the drive signal Vdrv is applied, of the Hall elements 2U are 2V are connected in series. One terminal of the terminal pair of the Hall element 2U is connected to the drive amplifier 9, which is a drive signal source. One terminal, which is on the side opposite from the Hall element 2U, of the terminal pair of the Hall element 2V is connected to ground GND via resistor Rd.

The Hall elements 2U and 2V of the rotation detecting unit 2 output the differential signal pairs HU+/HU− and HV+/HV−, respectively, to the differential unit 3 from the signal terminal pairs.

The differential unit (difference calculator) 3 includes a U-phase differential unit 31 and a V-phase differential unit 32. An amplification factor count Cnt, which is a gain for adjusting amplitude, is fed to the differential unit 3 from the gain counter 11. In the differential unit 3, the U-phase differential unit 31 receives the U-phase differential signal pair HU+/HU− from the Hall element 2U; the V-phase differential unit 32 receives the V-phase differential signal pair HV+/HV− from the Hall element 2V.

As illustrated in FIG. 2, each of the U-phase differential unit 31 and the V-phase differential unit 32 is a subtractor which uses an operational amplifier OP1. Resistor R01 is connected to a positive input terminal of the operational amplifier OP1. Resistor R02 is connected across the operational amplifier OP1 in a manner to connect between the line between resistor R01 and the positive input terminal and an output terminal of the operational amplifier OP1. Resistor R01 is connected to a negative input terminal of the operational amplifier OP1. Reference resistor R02 is connected to the negative input terminal in a manner to connect between the ground and the line between resistor R01 and the negative input terminal. When input signals Vin01 and Vin02 are fed to the positive terminal and the negative terminal, respectively, the subtractor which uses the operational amplifier OP1 performs difference computation indicated by Equation (4) below, and outputs a result of the computation as an output signal Vo01.

$$Vo01 = \frac{R02}{R01}(Vin02 - Vin01) + Vbias \quad (4)$$

Following Equations (5) indicate input signals, an output signal, and resistances of the subtractor illustrated in FIG. 2 configured as the U-phase differential unit 31.

$$(Vin01, Vin02, Vo01) = (HU-, HU+, Vu+Vbias)$$

$$(R01, R02) = (Rb, Cnt*Rb) \quad (5)$$

Meanwhile, each of the U-phase differential unit 31 and the V-phase differential unit 32 acts as a resistance-switchable resistor based on a predetermined reference resistance Rb and the amplification factor count Cnt which will be described later. More specifically, the resistance of resistor R01 is Rb, and the resistance of resistor R02 is Cnt*Rb. Resistor R02 is a resistance-switchable resistor. As illustrated in FIG. 3, resistor R02 includes three resistors, of which resistances are Rg, 2*Rg, and 4*Rg, connected in series and switches SW0, SW1, and SW2 connected in parallel which, when closed, short-circuits the resistors respectively. The switches SW0, SW1, and SW2 are respectively turned on or off as illustrated in FIG. 4 according to a value of the first bit (bit0), a value of the second bit (bit1), and a value of the third bit (bit2) of the amplification factor count Cnt whose word length is 3 bits. In this example, it is assumed that the resistances Rg and Rb are equal to each other (Rg=Rb).

As described above, the U-phase differential unit 31 outputs a U-phase sinusoidal signal Vu obtained by converting the U-phase differential signal pair HU+/HU− into a single-ended signal, multiplying the amplitude of the single-ended signal by Cnt, and adding an offset bias Vbias (imaginary ground) thereto.

The V-phase differential unit 32 has a configuration similar to that illustrated in FIGS. 2 and 3 of the U-phase differential unit 31 described above. However, input signals, an output signal, and resistances of the subtractor illustrated FIG. 2, which are indicated by following Equations (6), of the V-phase differential unit 32 differ from those of the U-phase differential unit 31.

$$(Vin01, Vin02, Vo01) = (HV-, HV+, Vv+Vbias)$$

$$(R01, R02) = (Rb, Cnt*Rb) \quad (6)$$

As does the U-phase differential unit 31, the V-phase differential unit 32 outputs a V-phase sinusoidal signal Vv which is obtained as indicated by Equations (1) to (5) by converting the V-phase differential signal pair HV+/HV− into a single-ended signal, multiplying the amplitude of the single-ended signal by Cnt, and adding the offset bias Vbias (imaginary ground) thereto.

Figure 5:
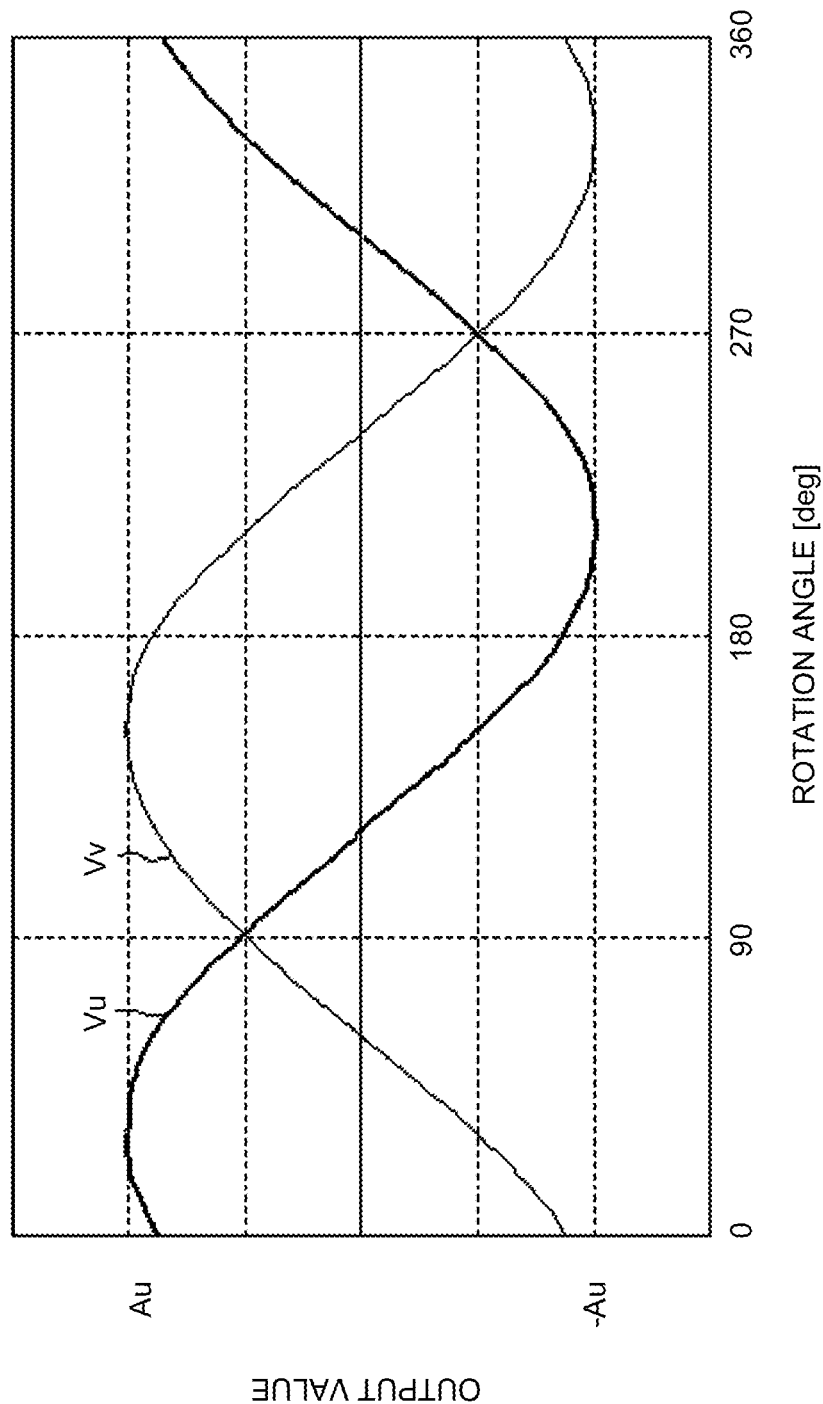
FIG. 5 is a waveform diagram of sinusoidal signals Vu and Vv.

The U-phase sinusoidal signal Vu and the V-phase sinusoidal signal Vv output from the differential unit 3 have sine waveforms of the rotation angle θ and differ from each other by 120 degrees in phase as illustrated in FIG. 5 and indicated by Equations (7) below.

$$Vu = Au * \sin\left(\theta + \frac{\pi}{3}\right) \quad (7)$$

$$Vv = Av * \sin\left(\theta - \frac{\pi}{3}\right)$$

The amplitude Au of the U-phase sinusoidal signal Vu and the amplitude Av of the V-phase sinusoidal signal Vv are multiplied by the amplification factor count Cnt as indicated by Equations (8) below with reference to the differential signals HU+, HU− and HV+, HV−, respectively.

$$Au = Ku * Vdrv * Cnt$$

$$Av = Kv * Vdrv * Cnt \quad (8)$$

$$(Cnt = 1, 2, 3, \ldots)$$

The differential unit 3 then outputs the U-phase sinusoidal signal Vu and the V-phase sinusoidal signal Vv to the vector generation unit 4.

Thus, the differential unit 3 functions as the difference calculator which calculates the difference between the differential signal pair HU+/HU− (detection signal) and the difference between the differential signal pair HV+/HV− (detection signal) output from the Hall elements 2U and 2V which are the plural detectors. The differential unit 3 includes resistor R02 which functions as an amplitude adjuster. The amplitude adjuster adjusts the amplitude of the differential signals HU+, HU− and HV+, HV− by multiplying the differential signals HU+, HU− and HV+, HV− by the amplification factor count Cnt generated by the gain counter 11. The gain counter 11 serves as a gain generator and generates a gain which depends on a level signal described below.

The vector generation unit (vector generator) 4 includes an X-axis-signal generating unit (hereinafter, "X-signal generating unit) 41 and a Y-axis-signal generating unit (hereinafter, "Y-signal generating unit) 42. The vector generation unit 4 generates two orthogonal signals, which are an X-axis signal X and a Y-axis signal Y, based on the sinusoidal signals Vu and Vv, and outputs the generated signals to the rotation calculating unit 5.

The X-signal generating unit 41 is a subtractor which uses such an operational amplifier as that illustrated in FIG. 2. Input signals, an output signal, and resistances of the subtractor illustrated in FIG. 2 of the X-signal generating unit 41 are expressed by following Equations (9).

$$(Vin01, Vin02, Vo01) = (Vv + Vbias, Vu + Vbias, X + Vbias)$$

$$(R01, R02) = (Rb, Rb/\sqrt{3}) \qquad (9)$$

More specifically, the X-signal generating unit 41 is such a subtractor as that illustrated in FIG. 2, in which the resistance of resistor R01 is the reference resistance Rb and the resistance of resistor R02 is Rb/√3, having a fixed amplification factor 1/√3. The X-signal generating unit 41 performs difference computation similar to that of Equation (4), and outputs a result of the computation as the output signal Vo01.

Figure 6:
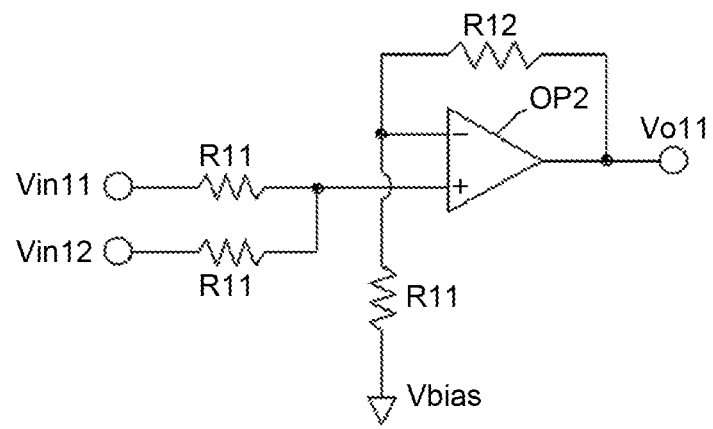
FIG. 6 is a circuit diagram of an adder.

The Y-signal generating unit 42 is an adder which uses such an operational amplifier OP2 as that illustrated in FIG. 6. The Y-signal generating unit 42 performs addition computation indicated by Equation (10) below, and outputs a result of the computation as an output signal Vo11.

$$Vo11 = \left(\frac{R12 + R11}{2 * R11}\right) * (Vin11 * Vin12) - \frac{R12}{R11} Vbias \qquad (10)$$

Resistors R11, which are connected in parallel, are connected to a positive input terminal of the operational amplifier OP2. Resistor R12 is connected across the operational amplifier OP2 in a manner to connect between an output terminal of the operational amplifier OP2 and a negative input terminal of the operational amplifier OP2, and resistor R11 is connected between the negative input terminal of the amplifier OP2 and the bias Vbias (imaginary ground). Each of an input signal Vin11 and an input signal Vin12 is fed to the operational amplifier OP2 of the Y-signal generating unit 42 via a corresponding one of resistors R11. Equations (11) below indicate the input signals, an output signal, and resistances of the Y-signal generating unit 42.

$$(Vin11, Vin12, Vo11) = (Vu + Vbias, Vv + Vbias, Y + Vbias)$$

$$(R11, R12) = (Rb, Rb) \qquad (11)$$

More specifically, the Y-signal generating unit 42 is such an adder as that illustrated in FIG. 6 in which each of the resistance of resistor R11 and the resistance of resistor R12 is the reference resistance Rb.

Accordingly, the vector generation unit 4 operates as follows. The X-signal generating unit 41 outputs the X-axis signal X obtained by performing computation of the upper one of Equations (12) on the sinusoidal signals Vu and Vv with the bias Vbias (imaginary ground) added thereto. The Y-signal generating unit 42 outputs the Y-axis signal Y obtained by performing computation of the lower one of Equations (12) on the sinusoidal signals Vu and Vv with the bias Vbias (imaginary ground) added thereto.

$$X = (Vu - Vv)/\sqrt{3} = Au^* \cos(\theta) \text{ (for } Ku = Kv)$$

$$Y = Vu + Vv = Au^* \sin(\theta) \qquad (12)$$

Figure 7:
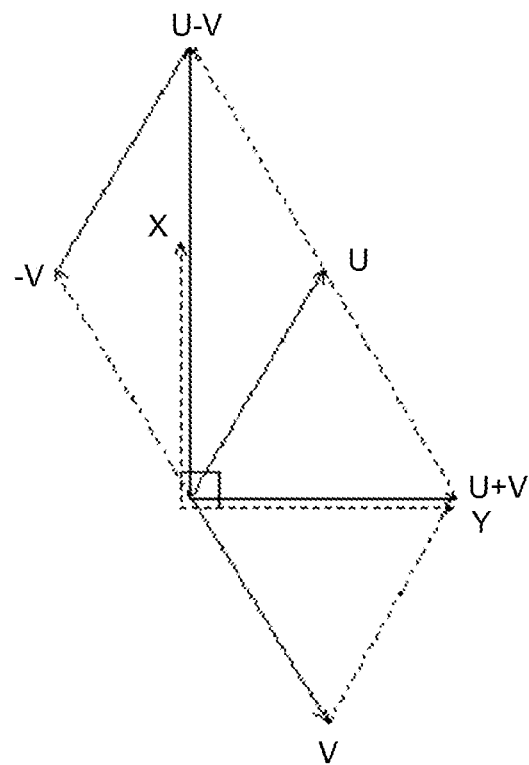
FIG. 7 is a diagram describing a vector generation process performed by a vector generation unit.
Figure 8:
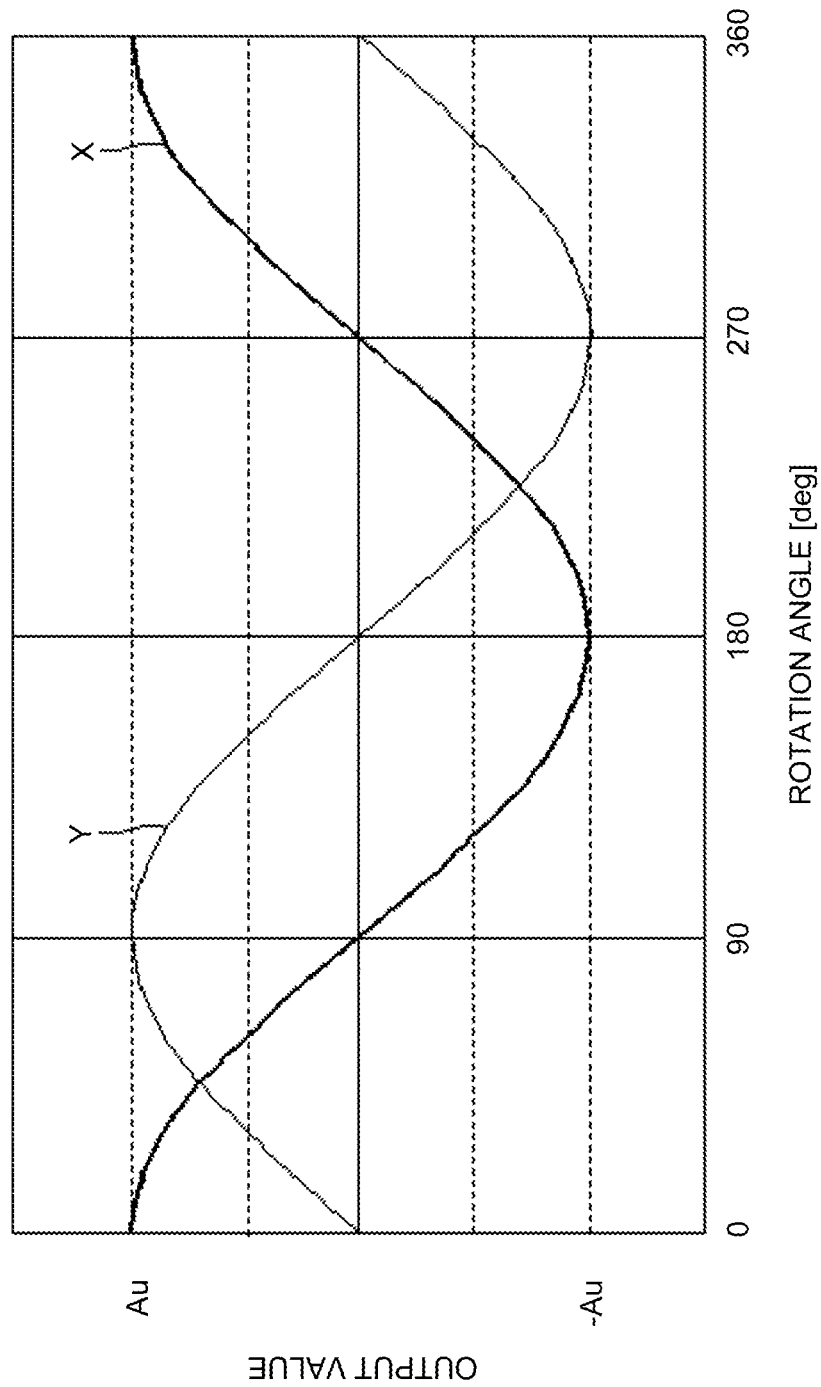
FIG. 8 is a diagram illustrating an example of an X-axis signal and a Y-axis signal.

More specifically, the vector generation unit 4 performs such computation as that illustrated in FIG. 7. Referring to FIG. 7, the vector generation unit 4 takes a U axis which lies at an angle of +45 degrees to the X axis and a V axis which lies at an angle of +45 degrees to the Y axis on the XY plane where the X axis and the Y axis are orthogonal to each other. When a unit vector U whose length is "1" and a unit vector V whose length is "1" are taken on the U axis and the V axis, respectively, a vector (U+V) is on the Y axis, and a vector (U−V) is on the X axis. The vector generation unit 4 generates the X-axis signal X and the Y-axis signal Y of such orthogonal waveforms as those illustrated in FIG. 8 by performing the computation of Equations (12) described above, and outputs the generated signals to the rotation calculating unit 5.

The rotation-angle detection device 1 of the first embodiment generates the two signals X and Y from the sinusoidal signals Vu and Vv phase difference therebetween is 120 degrees. However, signals from which the signals X and Y can be generated are not limited only to the sinusoidal signals Vu and Vv. More specifically, the signals X and Y may alternatively be generated by addition/subtraction of two or more sinusoidal signals so long as the obtained signals X and Y are orthogonal to each other. Further alternatively, if the sinusoidal signals Vu and Vv are orthogonal to each other, sinusoidal signals Vu and Vv may be output as the X-axis signal X and the Y-axis signal Y. In this case, the vector generation unit 4 can be omitted from the rotation-angle detection device 1.

The rotation calculating unit (rotation calculator) 5 includes a multiplication unit 51, an addition unit 52, a subtraction unit 53, and a memory 54. The rotation calculating unit 5 performs rotation conversion of the vector expressed by the X-axis signal X and the Y-axis signal Y using a value of a detected angle θd, which will be described later, thereby generating a rotated vector expressed by a rotated X-axis signal X' and a rotated Y-axis signal Y', which are results of the computation (conversion), and outputs the rotated vector to the control unit 8 and to the sign determining unit 6.

The multiplication unit 51 includes four resistors arranged in parallel in a resistor ladder configuration to form a digital analog converter (DAC) and can be built easily from plural resistors and switches. The X-axis signal X and the Y-axis signal Y are fed to the multiplication unit 51 from the vector generation unit 4. The multiplication unit 51 performs computation on the X-axis signal X and the Y-axis signal Y using sine data d sin and cosine data d cos, which will be described later, stored in the memory 54 as indicated by Equations (13) below.

$$X\cos = X * \frac{d\cos}{128}$$
$$Y\sin = Y * \frac{d\sin}{128}$$
$$X\sin = X * \frac{d\sin}{128}$$
$$Y\cos = Y * \frac{d\cos}{128}$$
(13)

The multiplication unit 51 outputs multiplication results X cos and Y sin to the addition unit 52 and multiplication results X sin and Y cos to the subtraction unit 53.

The addition unit 52 is such an adder as that illustrated in FIG. 6 which performs such computation as that indicated by Equation (10). Equations (14) below indicate input signals, an output signal, and resistances of the adder illustrated in FIG. 6.

$$(V\text{in}11, V\text{in}12, V\text{o}11) = (X\cos + V\text{bias}, Y\sin + V\text{bias}, X' + V\text{bias})$$

$$(R11, R12) = (Rb, Rb) \quad (14)$$

The addition unit 52 performs addition indicated by Equation (15) below on the multiplication result X cos and Y sin fed from the multiplication unit 51 and the bias Vbias. The addition unit 52 outputs, to the control unit 8, the rotated X-axis signal X' obtained by adding the bias Vbias (imaginary ground) to a result of the addition.

$$X' = X\cos + Y\sin \quad (15)$$

The subtraction unit 53 is such a subtractor as that illustrated in FIG. 2 which performs such computation as that indicated by Equation (4). Equations (16) below indicate input signals, an output signal, and resistances of the subtractor illustrated in FIG. 2.

$$(V\text{in}01, V\text{in}02, V\text{o}01) = (X\sin + V\text{bias}, Y\cos + V\text{bias}, Y' + V\text{bias})$$

$$(R01, R02) = (Rb, Rb) \quad (16)$$

The subtraction unit 53 performs subtraction indicated by Equation (17) below on the multiplication result X sin and Y cos fed from the multiplication unit 51 and the bias Vbias. The subtraction unit 53 outputs, to the sign determining unit 6, the rotated Y-axis signal Y' obtained by adding the bias Vbias (imaginary ground) to a result of the subtraction.

$$Y' = -X\sin + Y\cos \quad (17)$$

Figure 9:
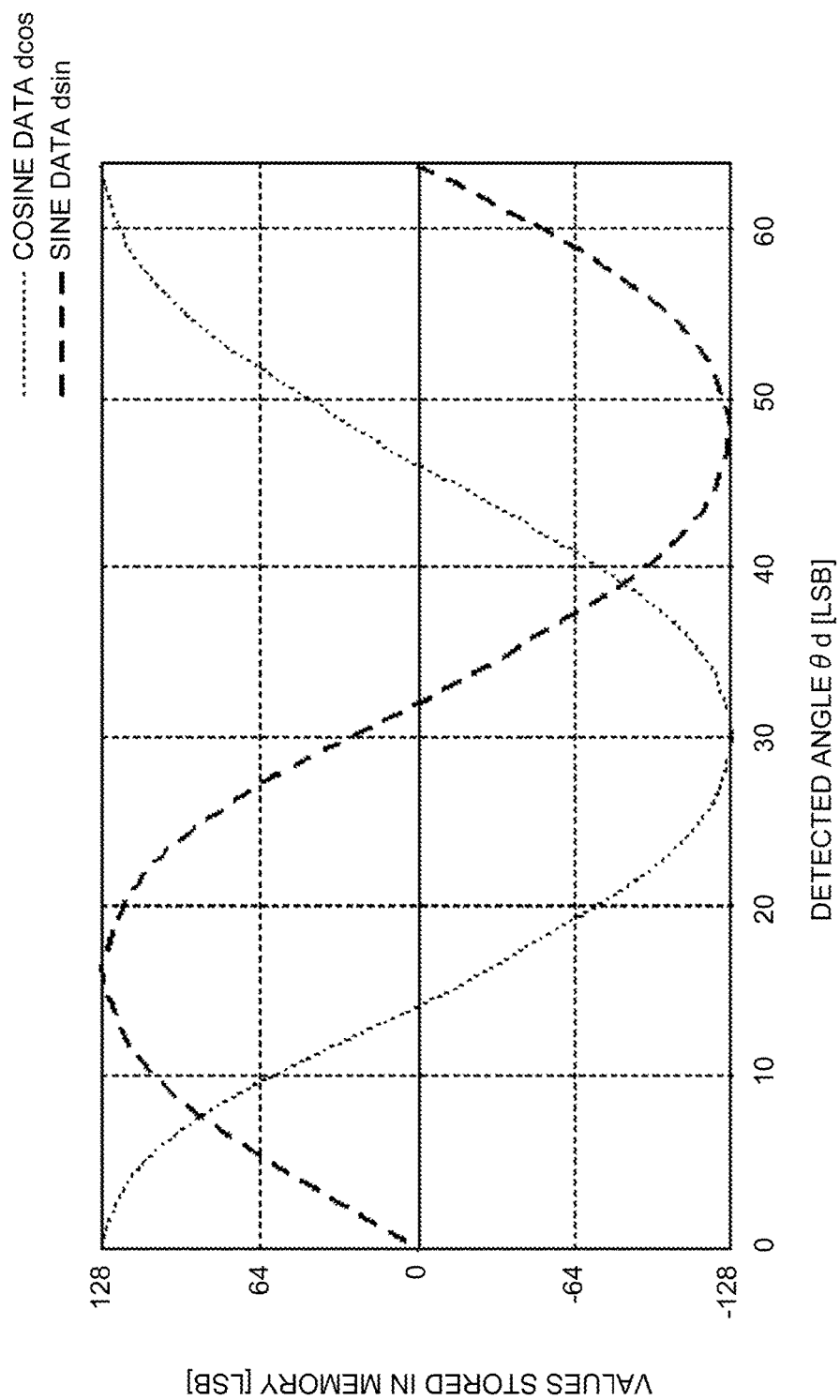
FIG. 9 is a diagram illustrating an example of sine data and cosine data stored in a memory.

The memory 54, which is a non-volatile memory, stores the sine data d sin and the cosine data d cos. Each of the sine data d sin and the cosine data d cos expresses amplitudes of a reference sine wave with 127 (least significant bits (LSB)) over one period divided into 64 divisions. When the detected angle θd whose word length is 6 bits is fed from the angle search unit 7, which will be described later, to the memory 54, the memory 54 outputs data values (the sine data d sin and the cosine data d cos) corresponding to the detected angle θd as illustrated in FIG. 9 to the multiplier 51.

Figure 10:
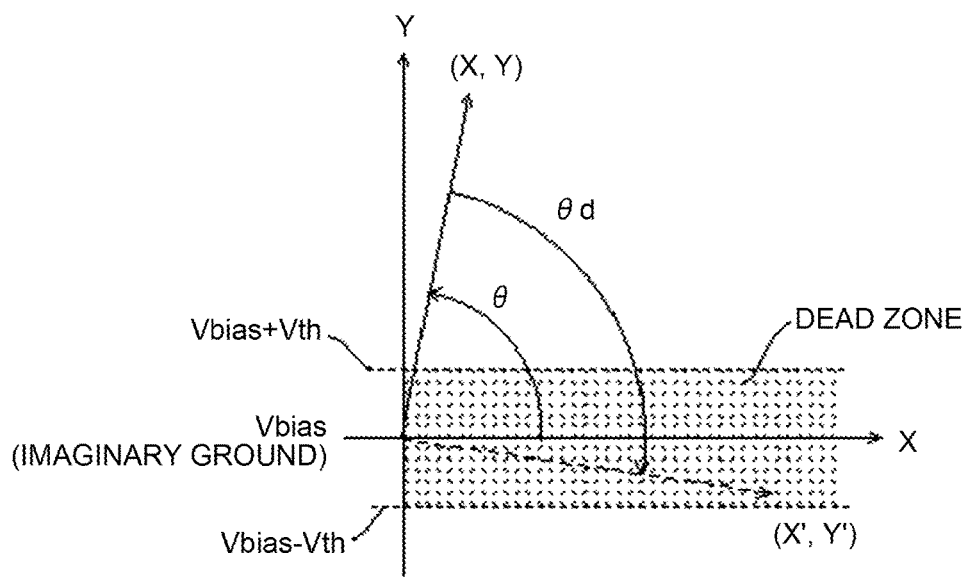
FIG. 10 is a diagram describing a sign determination process.

The sign determining unit 6 receives the rotated Y-axis signal Y' from the rotation calculating unit 5. As illustrated in FIG. 10, the sign determining unit 6 determines whether the rotated vector (X', Y') expressed by the rotated X-axis signal X' and the rotated Y-axis signal Y' is above a dead zone or below the dead zone. The dead zone has a preset width (2*Vth) with the X-axis (Y=0), which is a rotation target toward which the vector is to be rotated, at its center. The sign determining unit 6 makes this determination based only on the value of the rotated Y-axis signal Y' and outputs a result of the determination as an upper determination signal UP and a lower determination signal DN to the angle search unit 7.

More specifically, the sign determining unit 6 includes an upper determination unit 61 and a lower determination unit 62. The rotated Y-axis signal Y' is fed from the rotation calculating unit 5 to each of the upper determination unit 61 and the lower determination unit 62.

A value obtained by adding the bias Vbias to a dead-zone threshold Vth is fed to the upper determination unit 61. The upper determination unit 61 outputs, to the angle search unit 7, the upper determination signal UP of "Hi" when the rotated Y-axis signal Y' is equal to or higher than the dead-zone threshold (+Vth) on the positive side, but outputs the upper determination signal UP of "Lo" when the rotated Y-axis signal Y' is lower than the dead-zone threshold (+Vth) on the positive side as indicated by Equation (18) below. Note that, in FIG. 10, the offset bias Vbias (imaginary ground) is added to each of the rotated Y-axis signal Y' and the dead-zone threshold (+Vth), which is the criterion of the determination.

$$UP = \begin{cases} Hi & (Y' \geq Vth) \\ Lo & (Y' < Vth) \end{cases} \quad (18)$$

A value obtained by subtracting the offset bias Vbias from the dead-zone threshold Vth is fed to the lower determination unit 62. The lower determination unit 62 outputs, to the angle search unit 7, the lower determination signal DN of "Hi" when the rotated Y-axis signal Y' is equal to or lower than the dead-zone threshold (−Vth) on the negative side, but outputs the lower determination signal DN of "Lo" when the rotated Y-axis signal Y' is higher than the dead-zone threshold (−Vth) on the negative side as indicated by Equation (19) below. Note that, in FIG. 10, the offset bias Vbias (imaginary ground) is added to each of the rotated Y-axis signal Y' and the dead-zone threshold (−Vth), which is the criterion of the determination.

$$DN = \begin{cases} Hi & (Y' \leq -Vth) \\ Lo & (Y' > -Vth) \end{cases} \quad (19)$$

In short, if the rotated Y-axis signal Y' is within the dead-zone threshold (+Vth) on the positive side, the sign determining unit 6 outputs the upper determination signal UP of "Lo" or the lower determination signal DN of "Lo" to the angle search unit 7. If the rotated Y-axis signal Y' is equal to or higher than the dead-zone threshold (+Vth) on the positive side or equal to or lower than the dead-zone threshold (−Vth) on the negative side, the sign determining unit 6 outputs the upper determination signal UP of "Hi" or the lower determination signal DN of "Hi" to the angle search unit 7.

The dead zone defined near the X-axis allows the sign determining unit 6 to prevent chattering, which is repetition of operation in which the detected angle θd frequently rises up and falls down.

The clock generating unit 12 includes an oscillator 12a and a divider 12b. The clock generating unit 12 operates as follows. The oscillator 12a oscillates and outputs a clock signal clk of a predetermined frequency. The divider 12b divides the clock signal clk and outputs a trigger fs and a gain trigger fsg to units including the angle search unit 7 as necessary.

Figure 11:
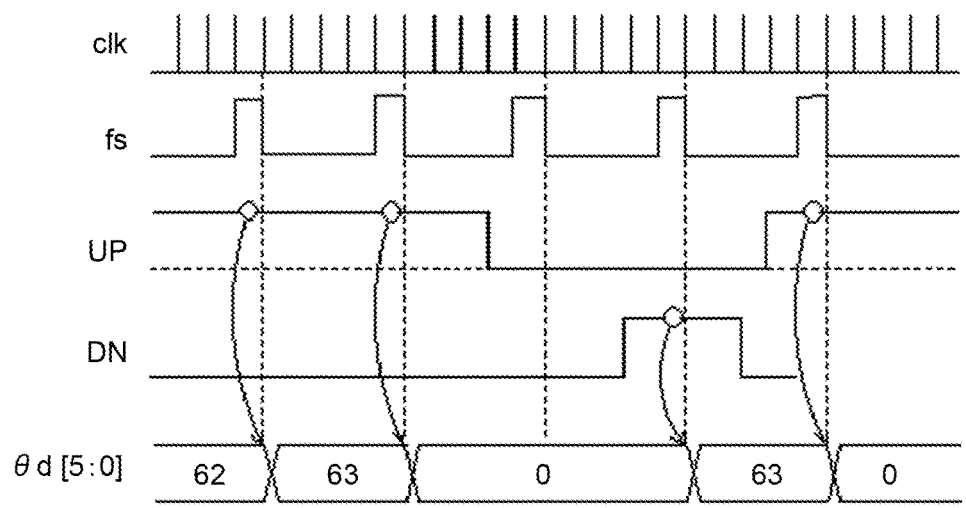
FIG. 11 is a diagram describing an angle search process performed by an angle search unit.

The angle search unit (rotation angle detector) 7 receives the upper determination signal UP and the lower determination signal DN from the sign determining unit 6 and receives the trigger fs from the clock generating unit 12. As illustrated in FIG. 11, each time the trigger fs is input to the angle search unit 7, the angle search unit 7 performs angle search by incrementing or decrementing the detected angle θd based on a result of determination as to whether the logic state of each of the determination signals UP and DN is "Hi" or "Lo". More specifically, if the logic state of the upper determination signal UP is "Hi" when the trigger fs is input, the angle search unit 7 increments the detected angle θd by "1" and outputs the incremented detected angle θd. If the logic state of the lower determination signal DN is "Hi", the angle search unit 7 decrements the detected angle θd by "1" and outputs the decremented detected angle θd. Thus, the angle search unit 7 causes the rotation calculating unit 5 to rotate the rotated vector based on the determination signals UP and DN until the rotated vector reaches the X-axis, which is the target phase. The angle search unit 7 detects an angle between the original vector and the rotated vector as a rotation angle of the rotor, and outputs the detected angle θd. The dead-zone threshold (+Vth) on the positive side and the dead-zone threshold (−Vth) on the negative side prevent the determination signals UP and DN from being simultaneously pulled to "Hi".

The detected angle θd is a detection (output) value of the rotation-angle detection device 1. In the first embodiment, the detected angle θd is data of 6-bit word length counted in iterations.

Figure 12:
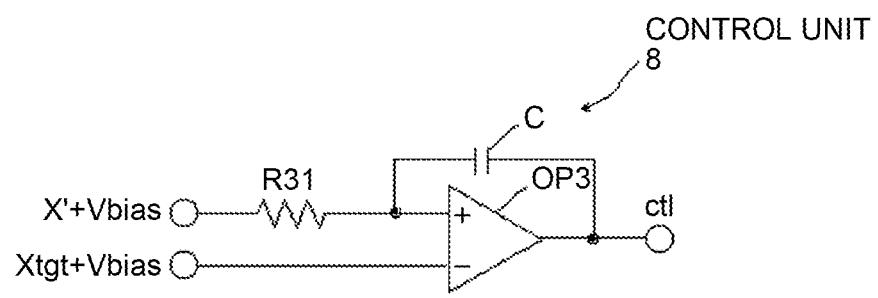
FIG. 12 is a circuit diagram of a control unit.

The control unit (amplitude detector) 8 is an integrator circuit which uses an operational amplifier OP3 as illustrated in FIG. 12. Resistor R31 is connected to a positive input terminal of the operational amplifier OP3. A capacitor C is connected to a feedback circuit which feeds back an output of the operational amplifier OP3 to the positive input terminal. A sum of the rotated X-axis signal X' and the bias Vbias is fed from the rotation calculating unit 5 to the positive input terminal of the operational amplifier OP3 via resistor R31. A sum of preset target amplitude Xtgt of the sinusoidal signal and the bias Vbias is fed to a negative input terminal of the operational amplifier OP3. As indicated by Equation (20) below, the control unit 8 computes integral of the difference between the rotated X-axis signal X' and the target amplitude Xtgt, and outputs a result of this computation to the drive amplifier 9 and to the threshold-value detecting unit 10 as a control signal (amplitude signal) ctl.

$$Ctl = Xtgt + Vbias + \frac{1}{CR31} \int (Xtgt - X')dt \quad (20)$$

Meanwhile, the control unit 8 can configure response-speed setting of the amplitude feedback loop which adjusts the amplitude of the differential signals HU+, HU− and HV+, HV− by selecting appropriate constants of the capacitor C and resistor R31 illustrated in FIG. 12, thereby adjusting the drive signal Vdrv applied to the Hall elements 2U and 2V by way of the drive amplifier 9.

The control unit 8 increases the control signal ctl when the rotated X-axis signal X' is lower than the target amplitude Xtgt of the sinusoidal signal, but decreases the control signal ctl when the rotated X-axis signal X' is higher than the target amplitude Xtgt of the sinusoidal signal. Put another way, when the detected angle data θd agrees with the rotation angle θ (i.e., when the rotated vector is near the X-axis which is the target), the rotated X-axis signal X' is equivalent of a detection value of the amplitude Au of the sinusoidal signal. Accordingly, the rotation-angle detection device 1 provides control of bringing the amplitude of the sinusoidal signal to the target amplitude Xtgt by feeding back the control signal ctl to the Hall elements 2U and 2V in the form of the drive signal Vdrv.

The drive amplifier (drive-power adjuster) 9 is an amplifier for supplying drive power, by which the Hall elements 2U and 2V are driven. The drive amplifier 9 applies drive power, which is proportional to the control signal (amplitude signal) ctl, as the drive signal Vdrv to the Hall elements 2U and 2V. It should be noted that even when the drive signal Vdrv is adjusted, there is an upper limit on the voltage that can be supplied from the rotation-angle detection device 1. The upper limit is the power supply voltage Vcc (not shown) which provides the drive voltage of the Hall elements 2U and 2V. In a case where the operational amplifier OP3 of the control unit 8 has sufficiently high drive capability, the operational amplifier OP3 may be formed in one piece with the drive amplifier 9 in the rotation-angle detection device 1.

The threshold-value detecting unit (level detector) 10 receives the control signal ctl as the amplitude signal from the control unit 8 and a drive limit (threshold value) Vlim, which is an upper limit value of the drive signal Vdrv. The threshold-value detecting unit 10 compares the control signal ctl against the drive limit Vlim as indicated by Equation (21) below. If the control signal ctl is equal to or higher than the drive limit Vlim, the threshold-value detecting unit 10 outputs a limit detection signal (level signal) GUP of "Hi" to the gain counter 11.

$$GUP = \begin{cases} Hi & (ctl \geq Vlim) \\ Lo & (ctl < Vlim) \end{cases} \quad (21)$$

If the control signal ctl is lower than the drive limit Vlim, the threshold-value detecting unit 10 outputs the limit detection signal (level signal) GUP of "Lo" to the gain counter 11. The drive limit Vlim is preferably a value that allows detection of approach of the drive signal Vdrv of the Hall elements 2U and 2V to the power supply voltage Vcc, which is the upper limit.

Figure 13:
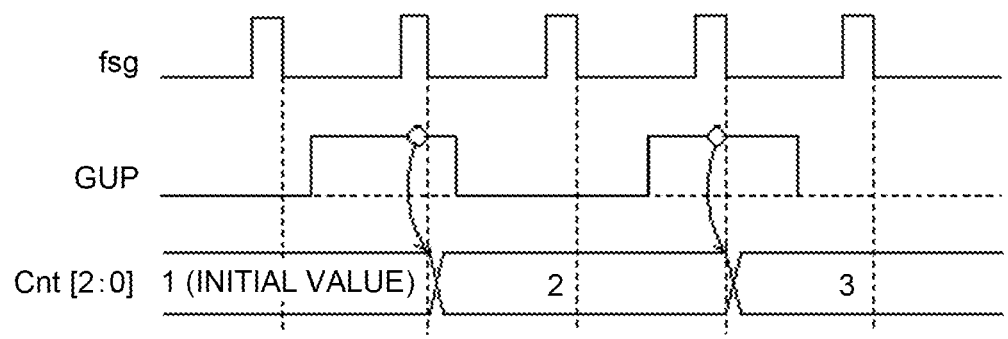
FIG. 13 is a diagram describing an amplification-factor counting process performed by a gain counter.

The gain counter (gain generator) 11 is a 3-bit counter which counts up the amplification factor count Cnt from its initial value "1". The gain counter 11 receives the limit detection signal GUP from the threshold-value detecting unit 10 and the gain trigger fsg from the clock generating unit 12. Each time receiving the gain trigger fsg, the gain counter 11 determines whether the limit detection signal GUP is "Hi" or "Lo" as illustrated in FIG. 13. If the limit detection signal GUP is "Hi", the gain counter 11 increments the amplification factor count Cnt by "1". The gain counter 11 outputs the incremented value to the differential unit 3 as the amplification factor count Cnt.

Put another way, the threshold-value detecting unit 10 functions as the level detector which compares the control signal (amplitude signal) ctl output from the control unit (amplitude detector) 8 against the drive limit Vlim, which is the predetermined threshold value, and outputs the limit detection signal GUP as the level signal which indicates a magnitude relation. The gain counter 11 functions as the gain generator which generates the amplification factor count Cnt. The amplification factor count Cnt is a gain of which amplification factor depends on the limit detection signal GUP output from the threshold-value detecting unit 10.

As described above, the amplification factor count Cnt is used by the differential unit 3 in adjusting the amplitude of the single-ended signals of the differential signal pairs HU+/HU− and HV+/HV− which are sinusoidal signals. Accordingly, the differential unit 3 includes resistor R02 which functions as the amplitude adjuster. The amplitude adjuster adjusts the amplitude of the differential signals HU+, HU− and HV+, HV− by multiplying the differential signals HU+, HU− and HV+, HV− by the gain generated by the gain generator.

Thus, the combination of the threshold-value detecting unit 10, the gain counter 11, and resistor R02 functions as a corrector which corrects the amplitude of the differential signals HU+, HU− and HV+, HV− based on the control signal (amplitude signal) ctl and outputs a corrected detection signal. In the first embodiment, the corrected detection signal is the sinusoidal signals Vu and Vv having undergone the amplitude adjustment performed by the differential unit 3.

Operations of the first embodiment are described below. The rotation-angle detection device 1 of the first embodiment can be built inexpensively and can detect a rotation angle of a rotor accurately.

Amplitude of the differential signals HU+, HU− and HV+, HV− output from the Hall elements 2U and 2V, which are magnetic sensors, of the rotation-angle detection device 1 varies greatly from device to device depending on individual differences in sensitivity of the Hall elements 2U and 2V, magnetization of the permanent magnet, distances between the Hall elements 2U and 2V and the permanent magnet, and the like. This variation can be an error factor of the detected angle θd.

Meanwhile, the differential signals HU+, HU− and HV+, HV− output from the Hall elements 2U and 2V vary with the drive signal Vdrv.

Under the circumstances, the rotation-angle detection device 1 of the first embodiment reduces the variations in the amplitude of the differential signals HU+/HU− and HV+/HV− output from the Hall elements 2U and 2V by adjusting the drive signal Vdrv applied to the Hall elements 2U and 2V based on the rotated X-axis signal X'. The rotated X-axis signal X' is one of the signals expressing the rotated vector generated from the differential signals HU+/HU− and HV+/HV− to detect the rotation angle θ of the rotor accurately. More specifically, the differential unit 3 of the rotation-angle detection device generates the sinusoidal signals Vu and Vv by adjusting the amplitude of the single-ended signals of the differential signal pairs HU+/HU− and HV+/HV−, which are output from the Hall elements 2U and 2V and which depend on the magnitude of the drive signal Vdrv, using the amplification factor count Cnt. The vector generation unit 4 of the rotation-angle detection device generates two orthogonal signals, which are the X-axis signal X and the Y-axis signal Y, from the sinusoidal signals Vu and Vv. The rotation calculating unit 5 of the rotation-angle detection device 1 performs rotation conversion of the vector expressed by the X-axis signal X and the Y-axis signal Y according to the value of the detected angle θd, and outputs the rotated vector expressed by the rotated X-axis signal X' and the rotated Y-axis signal Y', which are results of the computation (conversion), to the control unit 8 and to the sign determining unit 6.

The sign determining unit 6 of the rotation-angle detection device 1 determines whether the rotated vector (X', Y') expressed by the rotated X-axis signal X' and the rotated Y-axis signal Y' is above the dead zone or below the dead zone having the preset width (2*Vth) with the X-axis (Y=0), which is the rotation target toward which the vector is to be rotated, at its center. The sign determining unit 6 outputs the upper determination signal UP of "Lo" or the lower determination signal DN of "Lo" to the angle search unit 7 if the rotated Y-axis signal Y' is within the dead-zone threshold (+Vth) on the positive side. The sign determining unit 6 outputs the upper determination signal UP of "Hi" or the lower determination signal DN of "Hi" to the angle search unit 7 if the rotated Y-axis signal Y' is equal to or higher than the dead-zone threshold (+Vth) on the positive side or equal to or lower than the dead-zone threshold (−Vth) on the negative side. The angle search unit 7 causes the rotation calculating unit 5 to rotate the rotated vector based on the determination signals UP and DN until the rotated vector reaches the X-axis, which is the target phase. The angle search unit 7 detects an angle between the original vector and the rotated vector as a rotation angle of the rotor, and outputs the detected angle θd.

The control unit 8 of the rotation-angle detection device 1 computes integral of the difference between the rotated X-axis signal X' fed from the rotation calculating unit 5 and the target amplitude Xtgt or, in other words, the difference between amplitude values, and outputs a result of the computation to the drive amplifier 9 and to the threshold-value detecting unit 10 as the control signal ctl.

The drive amplifier 9 of the rotation-angle detection device 1 applies, as the drive signal Vdrv, the drive voltage which is proportional to the control signal ctl to the Hall elements 2U and 2V. The control unit 8 increases the control signal ctl if the rotated X-axis signal X' is lower than the target amplitude Xtgt of the sinusoidal signal, but decreases the control signal ctl if the rotated X-axis signal X' is higher than the target amplitude Xtgt of the sinusoidal signal. Put another way, the rotation-angle detection device 1 provides control of bringing the amplitude of the sinusoidal signal to the target amplitude Xtgt by feeding back the control signal ctl to the Hall elements 2U and 2V in the form of the drive signal Vdrv.

The threshold-value detecting unit 10 of the rotation-angle detection device 1 compares the control signal ctl against the drive limit Vlim. If the control signal ctl is equal to or higher than the drive limit Vlim, which indicates that the drive signal Vdrv of the Hall elements 2U and 2V is close to the power supply voltage Vcc which is the upper limit, the threshold-value detecting unit 10 outputs the limit detection signal GUP of "Hi" to the gain counter 11. If the control signal ctl is lower than the drive limit Vlim, the threshold-value detecting unit 10 outputs the limit detection signal GUP of "Lo" to the gain counter 11. Each time receiving the gain trigger fsg, the gain counter 11 determines whether the limit detection signal GUP is "Hi" or "Lo". If the limit detection signal GUP is "Hi", the gain counter 11 increments the amplification factor count Cnt by "1" and outputs Cnt to the differential unit 3. As described above, the differential unit 3 uses the amplification factor count Cnt in adjusting the amplitude of the single-ended signals of the differential signal pairs HU+/HU− and HV+/HV− which are the sinusoidal signals.

Figure 14:
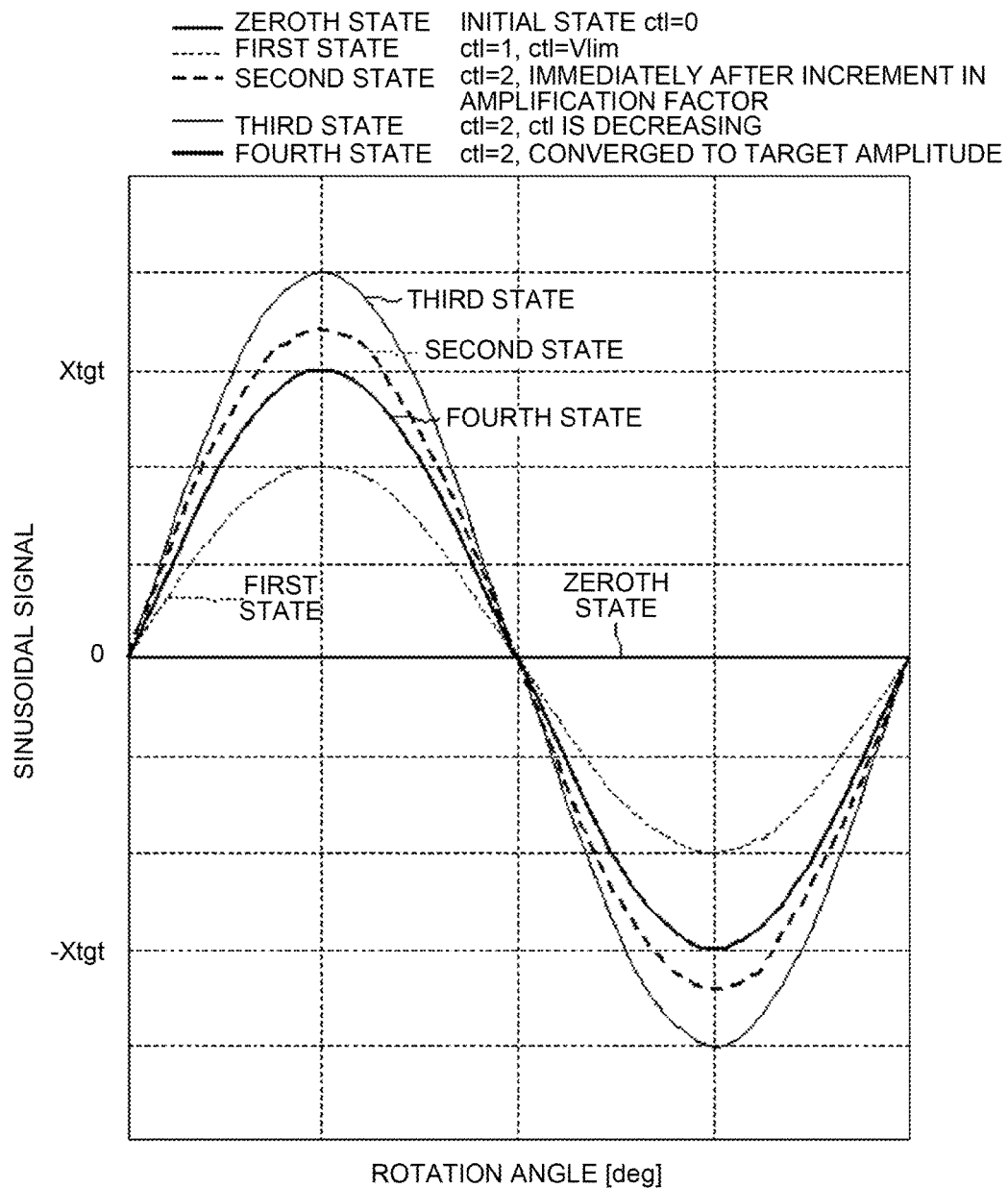
FIG. 14 is a diagram describing an amplitude control process.

How the amplitude feedback loop acts on the control signal ctl serving as the factor-switchable internal gain in the rotation-angle detection device 1 is illustrated by relationship between rotation angle θ and sinusoidal signal in FIG. 14.

FIG. 14 illustrates time-varying amplitude of the sinusoidal signal in relation to the rotation angle θ from an initial state where power supply to the rotation-angle detection device 1 is turned on. As can be seen from FIG. 14, the amplitude of the sinusoidal signal changes from its initial state, or a zeroth state, to a first state, to a second state, to a third state, and to a fourth state in this order, and eventually converges to the target amplitude Xtgt.

Referring to FIG. 14, the zeroth state is the initial state at power-on of the rotation-angle detection device 1 or the like. In the initial state, the control signal ctl and the Hall-element drive signal Vdrv are zero; the amplitude of the sinusoidal signal is zero.

The first state is a state where the amplification factor count Cnt is its initial value "1" and where the control unit 8 computes the integral of the difference between the amplitude of the sinusoidal signal and the target amplitude Xtgt, and the control signal ctl is increased to the drive limit Vlim. In the first state, although the amplitude is lower than the target amplitude Xtgt, the Hall-element drive signal Vdrv is close to the power supply voltage Vcc which is the upper limit.

The second state is a state where the amplification factor count Cnt is incremented by 1 to "2" because the control signal ctl has been increased to be equal to or higher than the drive limit Vlim. As a result, the amplitude of the sinusoidal signal is doubled in the rotation-angle detection device 1 to be higher than the target amplitude Xtgt.

The third state is a state where the control unit 8 computes the integral of the difference between the amplitude of the sinusoidal signal and the target amplitude Xtgt, and the control signal ctl is continuously decreased so that the amplitude of the sinusoidal signal converges to the target amplitude Xtgt.

The fourth state is a state where the amplitude of the sinusoidal signal has converged to the target amplitude Xtgt.

Thereafter, when the amplitude of the sinusoidal should change with lapse of time, the rotation-angle detection device 1 brings the amplitude of the sinusoidal signal to the target amplitude Xtgt in the following manner. The control unit 8 generates the control signal ctl by computing the integral of the difference between the amplitude of the sinusoidal signal and the target amplitude Xtgt and adjusts the drive signal Vdrv of the Hall elements 2U and 2V by way of the drive amplifier 9. The rotation-angle detection device 1 compares the control signal ctl output from the control unit 8 against the drive limit Vlim and adjusts the amplification factor count Cnt, which is the gain for amplitude adjustment performed by the differential unit 3, based on a result of the comparison.

Accordingly, the rotation-angle detection device 1 is capable of controlling the amplitude of the sinusoidal signals to the target amplitude Xtgt accurately with the inexpensive structure and, accordingly, capable of detecting the rotation angle θ of the rotor accurately.

More specifically, there is a limit to the value to which the amplitude of the sinusoidal signal can be increased because the drive voltage of the Hall elements 2U and 2V is limited by the power supply voltage Vcc. However, the rotation-angle detection device 1 has the amplitude adjustment function, which is provided by the differential unit 3 by utilizing the amplification factor count Cnt, as a gain-factor switching function which allows adjusting amplitude even when the amplitude is increased to be equal to or higher than a certain value. Accordingly, the rotation-angle detection device 1 can appropriately resolve fluctuations in the amplitude of the sinusoidal signal so long as the fluctuations are in a range from zero to a certain level.

Meanwhile, during a period referred to as an initial search, in which the detected angle data θd is adjusted toward but does not reach the rotation angle yet (e.g., immediately after power-on), the rotated X-axis signal X' does not represent actual amplitude of the sinusoidal signal. During this period, the amplitude feedback loop does not function normally in theory. However, it is possible to cause the angle-detection initial search, which is performed in response to the sampling trigger fs for angle detection, to converge sufficiently quickly relative to a response speed of the amplitude feedback loop of the control unit 8 by sufficiently slowing down the response speed of the amplitude feedback loop. As a result, the rotation-angle detection device 1 can perform the initial search and the amplitude feedback loop for angle detection simultaneously without requiring addition of a particular sequence control therefor.

As described above, the rotation-angle detection device 1 according to an aspect of the first embodiment includes: the plural Hall elements (rotation detectors) 2U and 2V configured and arranged to output the differential signal pairs (detection signals) HU+/HU− and HV+/HV− which vary sinusoidally with the rotation angle of the rotor (rotation axis) and differ from each other in phase, and amplitude of which varies with the magnitude of the drive signal (drive power) Vdrv; the rotation calculating unit (rotation calculator) 5 configured to output a rotated vector by rotating a vector expressed by the two or more detection signals; the control unit (amplitude detector) 8 configured to output the control signal (amplitude signal) ctl, which indicates the amplitude of the detection signals, by performing computation on at least one (the rotated X-axis signal X') of the signals expressing the rotated vector using the target amplitude Xtgt, which is the predetermined target amplitude; the drive amplifier (drive-power adjuster) 9 configured to adjust the amplitude of the detection signals by changing the drive signal Vdrv applied to the Hall elements 2U and 2V according to the control signal ctl; a corrector including the threshold-value detecting unit 10, the gain counter 11, and resistor R02 and configured to correct the amplitude of the detection signals based on the control signal ctl and output a corrected detection signal; and the angle search unit (rotation angle detector) 7 configured to detect a rotation angle of the rotor based on the corrected detection signal.

According to this aspect, the rotation-angle detection device 1 is capable of correcting the amplitude of the detection signals irrespective of screening of the Hall elements 2U and 2V in sensitivity levels, magnetizing the permanent magnet with higher accuracy, and arrangement of the Hall elements 2U and 2V and therefore capable of detecting the rotation angle of the rotor accurately with an inexpensive structure.

According to another aspect of the first embodiment, the rotation-angle detection device 1 is applied to an image processing apparatus including: a rotor; and a drive mechanism which is for various types of image processing and which is to be driven by rotation of the rotor, in which the rotation-angle detection device 1 detects a rotation angle of the rotor so that rotation of the rotor can be controlled.

According to this aspect, a rotation angle of a rotor such as a brushless DC motor which is driven for an image forming operation, an image reading operation, or the like can be detected with a compact and inexpensive structure.

According to another aspect of the first embodiment, the rotation-angle detection device 1 performs a rotation-angle detection method including: performing rotation calculation to output a rotated vector by rotating a vector expressed by two or more detection signals output from the plural Hall elements 2U and 2V configured and arranged to output the detection signals which vary sinusoidally with the rotation angle of the rotor and differ from each other in phase, and amplitude of which varies with the magnitude of drive power to obtain a rotated vector; performing amplitude detection to output the control signal (amplitude signal) ctl indicating the amplitude of the detection signals by performing computation on at least one of signals expressing the rotated vector using a predetermined target amplitude; adjusting the amplitude of the detection signals by changing the drive signal (drive power) Vdrv applied to the Hall elements 2U and 2V according to the control signal ctl; correcting including correcting the amplitude of the detection signals based on the control signal ctl and outputting a corrected detection signal; and detecting a rotation angle of the rotor based on the corrected detection signal.

According to this aspect, the rotation-angle detection device 1 is capable of correcting the amplitude of the detection signals irrespective of screening of the Hall elements 2U and 2V in sensitivity levels, magnetizing the permanent magnet with higher accuracy, and arrangement of the Hall elements 2U and 2V and, accordingly, capable of detecting the rotation angle of the rotor accurately with an inexpensive structure.

According to another aspect of the first embodiment, the corrector of the rotation-angle detection device 1 includes: the threshold-value detecting unit (level detector) 10 configured to compare the control signal (amplitude signal) ctl against the drive limit Vlim, which is the predetermined threshold value, and outputs the limit detection signal (level signal) GUP indicating a magnitude relation; the gain counter (gain generator) 11 configured to generate the amplification factor count Cnt which is a gain which depends on the limit detection signal GUP; and resistor R02 (amplitude adjuster) of the differential unit 3 configured to adjust the amplitude of the detection signals by multiplying the detection signals by the amplification factor count Cnt generated by the gain counter 11.

According to this aspect, the rotation-angle detection device 1 is capable of correcting the amplitude of the detection signals with a simple structure and therefore capable of detecting the rotation angle of the rotor more accurately with the structure which can be built further inexpensively.

According to another aspect of the first embodiment, the gain (amplification factor count Cnt) generated by the gain counter (gain generator) 11 of the rotation-angle detection device 1 changes only to increase the amplification factor.

According to this aspect, the rotation-angle detection device 1 is capable of correcting the amplitude of the detection signals with a further simple structure and therefore capable of detecting the rotation angle of the rotor more accurately with the structure which can be built further inexpensively.

According to another aspect of the first embodiment, the rotation-angle detection device 1 further includes: the differential unit (difference calculator) 3 configured to calculate at least two of differences (the U-phase sinusoidal signal Vu and the V-phase sinusoidal signal Vv), each of which is a difference between one of the detection signal pairs output from the plural Hall elements 2U and 2V; and the vector generation unit (vector generator) 4 configured to generate the vector expressed by the detection signals based on at least two of the differences (the U-phase sinusoidal signal Vu and the V-phase sinusoidal signal Vv) calculated by the differential unit 3 and output the vector to the rotation calculating unit (rotation calculator) 5. The differential unit 3 includes resistor R02 as the amplitude adjuster. Resistor R02 adjusts the amplitude of the detection signals by multiplying the detection signals by the amplification factor count Cnt when the differential unit 3 calculates the differences between the detection signal pairs.

According to this aspect, the differential unit 3 is capable of adjusting the amplitude of the differential signal pairs (detection signals) HU+/HU− and HV+/HV− output from the Hall elements 2U and 2V. Accordingly, the amplitude of the detection signals can be corrected with a simple structure. As a result, the rotation angle of the rotor can be detected more accurately with the structure which can be built further inexpensively.

Second Embodiment

Figure 15:
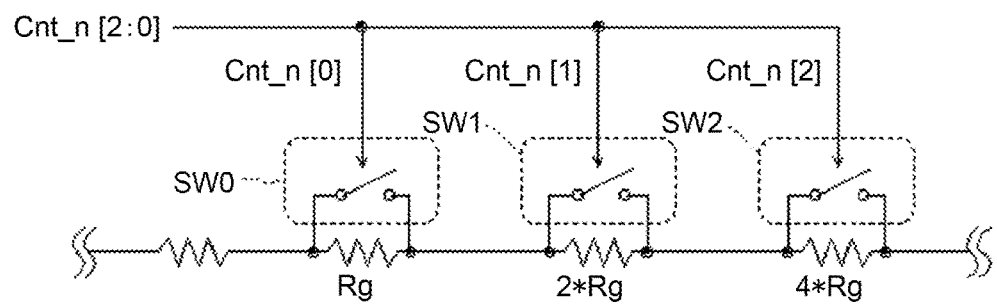
FIG. 15 is a circuit diagram of a resistance-switchable resistor according to a second embodiment of the present invention.
Figure 16:
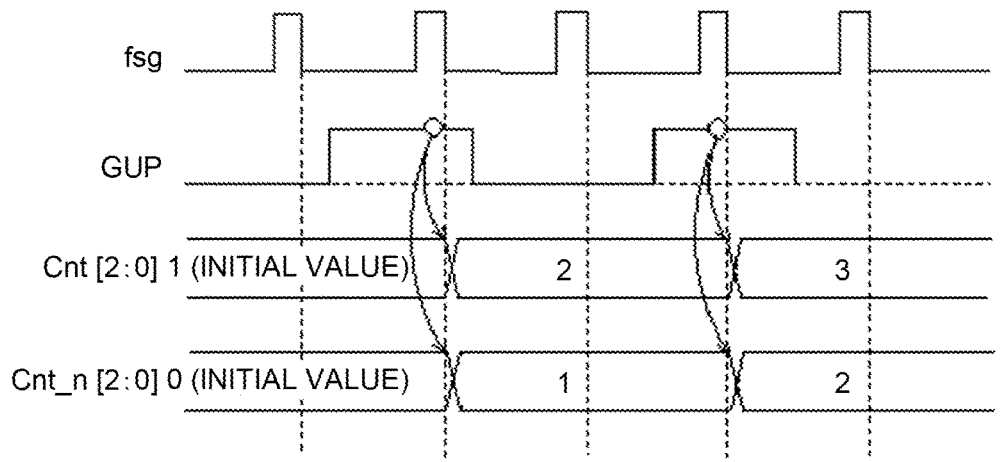
FIG. 16 is a diagram describing an amplification-factor counting process performed by the gain counter according to the second embodiment.

FIGS. 15 to 16 are diagrams explaining rotation-angle detection methods and devices, and an image processing apparatus according to a second embodiment of the present invention. FIG. 15 is a circuit diagram of resistor R12 included in a vector generation unit of a rotation-angle detection device according to the second embodiment.

The second embodiment is applied to a rotation-angle detection device similar to the rotation-angle detection device 1 of the first embodiment. Repeated use of reference characters throughout the second embodiment and appended drawings is intended to represent the same as, or analogous to, those of the first embodiment, and repeated description is omitted or simplified.

The rotation-angle detection device 1 of the second embodiment includes, as does the rotation-angle detection device 1 of the first embodiment, the Hall elements 2U and 2V, the differential unit 3, the vector generation unit 4, the rotation calculating unit 5, the sign determining unit 6, the angle search unit 7, the control unit 8, the drive amplifier 9, the threshold-value detecting unit 10, the gain counter 11, and the clock generating unit 12.

In the rotation-angle detection device 1 of the first embodiment, the differential unit 3 performs the amplitude adjustment using the gain of the sinusoidal signals. In contrast, in the rotation-angle detection device 1 of the second embodiment, the vector generation unit 4 performs the amplitude adjustment.

In the first embodiment, resistance-switchable resistors are employed by the differential unit 3 as reference resistors R02 of the operational amplifiers OP1 of the subtractors illustrated in FIG. 2 configured as the U-phase differential unit 31 and the V-phase differential unit 32, respectively. In contrast, in the second embodiment, fixed resistors are employed as reference resistors R02.

Thus, in the second embodiment, input signals, output signals, and resistances of the subtractors illustrated in FIG. 2 configured as the U-phase differential unit 31 and the V-phase differential unit 32 of the differential unit 3 are independent of the amplification factor count Cnt as indicated by following Equations (22) and (23), respectively.

$$(Vin01, Vin02, Vo01) = (HU-, HU+, Vu+Vbias)$$

$$(R01, R02) = (Rb, Rb) \quad (22)$$

$$(Vin01, Vin02, Vo01) = (HV-, HV+, Vv+Vbias)$$

$$(R01, R02) = (Rb, Rb) \quad (23)$$

Accordingly, the differential unit 3 outputs the U-phase sinusoidal signal Vu and the V-phase sinusoidal signal Vv expressed by following Equations (24) to the vector generation unit 4.

$$Vu = Au0 * \sin\left(\theta + \frac{\pi}{3}\right) \quad (24)$$

$$Vv = Av0 * \sin\left(\theta - \frac{\pi}{3}\right)$$

The amplitudes Au0 and Av0 of Equations (24) are the values indicated by Equations (2) and (3) above.

The vector generation unit 4 includes the X-signal generating unit 41 which is a subtractor which uses the operational amplifier OP1 as illustrated in FIG. 2, and the Y-signal generating unit 42 which is an adder which uses the operational amplifier OP2 as illustrated in FIG. 6. In the first embodiment, a fixed resistor is used as resistor R02 of the subtractor. In contrast, in the second embodiment, resistance-switchable resistors are used as resistor R02 of the subtractor and resistor R12 of the adder.

More specifically, input signals, an output signal, and resistances of the X-signal generating unit 41, which is the subtractor illustrated in FIG. 2, of the second embodiment are indicated by following Equations (25). Thus, the subtractor acts as a resistance-switchable resistor which is based on the amplification factor count Cnt and in which the resistance of resistor R01 is the reference resistance Rb, and the resistance of resistor R02 is Cnt*Rb/√3.

$$(Vin01, Vin02, Vo01) = (Vv + Vbias, Vu + Vbias, X + Vbias) \quad (25)$$

$$(R01, R02) = \left(Rb, \frac{Cnt * Rb}{\sqrt{3}}\right)$$

More specifically, the X-signal generating unit 41 of the second embodiment differs from that of the first embodiment in that resistor R02 of the subtractor illustrated in FIG. 2, which is the X-signal generating unit 41, is the resistance-switchable resistor, and the resistance Rg thereof is set to Rb/√3. Accordingly, the X-signal generating unit 41 of the second embodiment has, in addition to the computation function provided by the X-signal generating unit 41 of the first embodiment, the computation function of performing multiplication by the factor-switchable gain Cnt.

The Y-signal generating unit 42 of the second embodiment differs from that of the first embodiment in that input signals, an output signal, and resistances of the adder, which is the Y-signal generating unit 42, are indicated by following Equations (26). Thus, the adder serves as a resistance-switchable resistor which is based on an amplification factor count Cnt-1 and in which the resistance of resistor R11 is Rb, and the resistance of resistor R12 is (2*Cnt-1)*Rb.

$$(Vin11, Vin12, Vo11) = (Vu+Vbias, Vv+Vbias, Y+Vbias)$$

$$(R11, R12) = (Rb, (2*Cnt-1)*Rb) \quad (26)$$

As illustrated in FIG. 15, the resistance-switchable resistor used as resistor R12 of the adder, which is the Y-signal generating unit 42 of the second embodiment, includes three resistors, of which resistances are Rg, 2*Rg, and 4*Rg, connected in series and the switches SW0, SW1, and SW2 connected in parallel which, when closed, short-circuits the resistors respectively. The switches SW0, SW1, and SW2 are respectively turned on or off as illustrated in FIG. 4 according to a value of the first bit (bit0), a value of the second bit (bit1), and a value of the third bit (bit2) of the amplification factor count Cnt_n whose word length is 3 bits. The amplification factor count Cnt_n is the value obtained by subtracting "1" from the amplification factor count Cnt. In this example, it is assumed that the resistances Rg and Rb are equal to each other.

More specifically, the Y-signal generating unit 42 of the second embodiment differs from that of the first embodiment in that the adder, which is the Y-signal generating unit 42, includes resistor (resistance-switchable resistor) R12 illustrated in FIG. 15 in place of resistor R12 illustrated in FIG. 6. Accordingly, the Y-signal generating unit 42 of the second embodiment has, in addition to the computation function provided by the Y-signal generating unit 42 of the first embodiment, the computation function of performing multiplication by the factor-switchable gain Cnt.

The vector generation unit 4 configured as described above generates the X-axis signal X and the Y-axis signal Y indicated by Equations (12) and (8) and outputs the signals to the rotation calculating unit 5.

As illustrated in FIG. 16, the gain counter 11 of the rotation-angle detection device 1 of the second embodiment counts up the amplification factor count Cnt whose initial value is "1" as in the first embodiment. Furthermore, the gain counter 11 counts up the amplification factor count Cnt_n whose initial value is "0" and outputs the counted values to the vector generation unit 4. More specifically, each time receiving the gain trigger fsg, the gain counter 11 determines whether the limit detection signal GUP is "Hi" or "Lo" as illustrated in FIG. 16. If the limit detection signal GUP is "Hi", the gain counter 11 increments the amplification factor count Cnt whose initial value is "1" and the amplification factor count Cnt_n whose initial value is "0" by "1". The gain counter 11 outputs the counted values to the vector generation unit 4 as the amplification factor count Cnt and the amplification factor count Cnt_n.

As described above, according to an aspect of the second embodiment, the rotation-angle detection device 1 includes: the differential unit (difference calculator) 3 configured to calculate two or more differences (the U-phase sinusoidal signal Vu and the V-phase sinusoidal signal Vv), each of which is a difference between one of the differential signal pairs (detection signals) HU+/HU− and HV+/HV− output from the plural Hall elements 2U and 2V; and the vector generation unit (vector generator) 4 configured to generate the vector (the X-axis signal X, the Y-axis signal Y) expressed by the detection signals based on at least two of the differences (the U-phase sinusoidal signal Vu and the V-phase sinusoidal signal Vv) calculated by the differential unit 3 and output the vector to the rotation calculating unit (rotation calculator) 5. The vector generation unit 4 includes resistor R02 serving as the amplitude adjuster. The amplitude adjuster adjusts the amplitude of the detection signals (the U-phase sinusoidal signal Vu and the V-phase sinusoidal signal Vv) serving as the detection signals by multiplying the detection signals by the amplification factor count Cnt when the vector generation unit 4 generates the vector (the X-axis signal X, the Y-axis signal Y) expressed by the detection signals.

According to this aspect, the differential unit 3 is capable of adjusting the amplitude of the differential signal pairs HU+/HU− and HV+/HV− (detection signals) output from the Hall elements 2U and 2V at generation of the vector. Accordingly, the amplitude of the detection signals can be corrected with a simple structure. As a result, the rotation angle of the rotor can be detected more accurately with the structure which can be built further inexpensively.

In the above description, the differential unit 3 or the vector generation unit 4 performs multiplication by the amplification factor counts Cnt and Cnt_n that are switchable gains. Alternatively, a modification in which the rotation calculating unit 5 performs the multiplication may be employed.

The rotation-angle detection device 1 of this modification is basically identical in configuration with the rotation-angle detection device 1 of the first embodiment except that the differential unit 3 is configured as in the second embodiment, in which resistor R02 is a fixed resistor. The vector generation unit 4 of the rotation-angle detection device 1 of this modification is configured as in the first embodiment, in which resistor R12 is a fixed resistor.

In the modification configured as described above, the differential unit 3 does not perform the multiplication by the gain. Accordingly, the vector generation unit 4 outputs the X-axis signal X and the Y-axis signal Y indicated by Equations (2) and (3), and Equations (27).

$$X=(Vu-Vv)/\sqrt{3}=Au0*\cos(\theta) \text{ (for } Ku=Kv)$$

$$Y=Vu+Vv=Au0*\sin(\theta) \tag{27}$$

In the modification, the gain counter 11 of the rotation-angle detection device 1 is configured as in the second embodiment. The gain counter 11 counts up the amplification factor count Cnt and the amplification factor count Cnt_n and outputs the counted values to the rotation calculating unit 5.

The rotation-angle detection device 1 of this modification is configured as in the first embodiment except for the configuration described above and the rotation calculating unit 5.

As in the first embodiment, the rotation calculating unit 5 includes the multiplication unit 51, the addition unit 52, the subtraction unit 53, and the memory 54. The multiplication unit 51 and the memory 54 are similar in configuration to those of the first embodiment.

The addition unit 52 is an adder similar to the adder illustrated in FIG. 6, in which resistor R12 is a resistance-switchable resistor. Input signals, an output signal, and resistances of the addition unit 52 are indicated by following Equations (28).

$$(Vin11, Vin12, Vo11)=(X\cos+V\text{bias}, Y\sin+V\text{bias}, X'+V\text{bias})$$

$$(R11,R12)=(Rb,(2*Cnt-1)*Rb) \tag{28}$$

More specifically, the addition unit 52 is such an adder as illustrated in FIG. 6 in which the resistance of resistor R11 is Rb, and resistor R12 is a resistance-switchable resistor where the resistance of which as illustrated in FIG. 15 is $(2*Cnt-1)*Rb$.

The subtraction unit 53 is a subtractor similar to the subtractor illustrated in FIG. 2, in which resistor R02 is a resistance-switchable resistor. Input signals, an output signal, and resistances of the subtraction unit 53 are indicated by following Equations (29).

$$(Vin01, Vin02, Vo01)=(X\sin+V\text{bias}, Y\cos+V\text{bias}, Y'+V\text{bias})$$

$$(R01,R02)=(Rb,Cnt*Rb) \tag{29}$$

More specifically, the subtraction unit 53 is such a subtractor as illustrated in FIG. 2 in which the resistance of resistor R01 is Rb, and resistor R02 is a resistance-switchable resistor where the resistance of which as illustrated in FIG. 3 is $Cnt*Rb/\sqrt{3}$.

Accordingly, when outputting the rotated vector expressed by the rotated X-axis signal X' and the rotated Y-axis signal Y', which are generated by rotating the vector expressed by the X-axis signal X and the Y-axis signal Y, which are the two or more detection signals, the rotation calculating unit 5 can adjust the amplitude of the rotated X-axis signal X' and the rotated Y-axis signal Y' generated from the detection signals by multiplying the X-axis signal X and the Y-axis signal Y by the amplification factor count Cnt. As a result, the rotation angle of the rotor can be detected more accurately with the further inexpensive structure.

According to an aspect of the present invention, a rotation angle of a rotor can be detected accurately with an inexpensive structure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rotation-angle detection device for detecting a rotation angle of a rotor, the rotation-angle detection device comprising:
   plural rotation detectors attached to the rotor and configured and arranged to output, from each of the plural rotation detectors, two or more detection signals as differential signal pairs, the detection signals varying sinusoidally with the rotation angle of the rotor and differing from each other in phase, and amplitude of the detection signals varying with magnitude of drive power applied to the rotation detectors;
   a vector generator that generates two vector signals from the detection signals and outputs the generated signals;
   a rotation calculator that receives the two vector signals from the vector generator and is configured to output two rotated vectors by performing rotation conversion of a vector expressed by the generated signals and outputs the rotated vectors;
   a controller configured to receive at least one rotated vector from the rotation calculator and output a control signal by making a comparison between the at least one rotated vector and a target value;
   a drive-power adjuster configured to receive the control signal from the controller and feedback the control signal to the rotation detectors in the form of a drive power signal that brings the amplitude of the detection signals to a target amplitude;
   a corrector configured to correct the amplitude of the detection signals based on the control signal and output a corrected detection signal; and
   a rotation angle detector configured to detect a rotation angle of the rotor based on the corrected detection signal.

2. The rotation-angle detection device according to claim 1, wherein
the corrector includes
a level detector configured to compare the control signal against a predetermined threshold value and output a level signal indicating a magnitude relation between the control signal and the predetermined threshold value,
a gain generator configured to generate a gain, the gain being an amplification factor which depends on the level signal, and
an amplitude adjuster configured to adjust the amplitude of the detection signals by multiplying the detection signals by the gain generated by the gain generator.

3. The rotation-angle detection device according to claim 2, wherein
the gain generated by the gain generator changes only to increase the amplification factor.

4. The rotation-angle detection device according to claim 1, further comprising a difference calculator which calculates a difference between respective differential signal pairs output from the plural detectors.

5. The rotation-angle detection device according to claim 2, wherein
the vector generator is configured to generate the vector expressed by the detection signals based on at least two of the differences calculated by the difference calculator and output the vector to the rotation calculator, and wherein
the vector generator includes the amplitude adjuster, the amplitude adjuster adjusting the amplitude of the detection signals by multiplying the detection signals by the gain when the vector generator generates the vector expressed by the detection signals.

6. The rotation-angle detection device according to claim 2, wherein
the rotation calculator includes the amplitude adjuster.

7. An image processing apparatus comprising:
a rotor;
a drive mechanism for various types of image processing, the drive mechanism being to be driven by rotation of the rotor; and
a rotation-angle detector configured to detect a rotation angle of the rotor so that rotation of the rotor is controlled, wherein
the rotation-angle detector comprises;
plural rotation detectors attached to the rotor and configured and arranged to output, from each of the plural rotation detectors, two or more detection signals as differential signal pairs, the detection signals varying sinusoidally with the rotation angle of the rotor and differing from each other in phase, and amplitude of the detection signals varying with magnitude of drive power applied to the rotation detectors,
a vector generator that generates two vector signals from the detection signals and outputs the generated signals,
a rotation calculator that receives the two vector by performing rotation conversion of a vector expressed by the generated signals and outputs the rotated vectors,
a controller configured to receive at least one rotated vector from the rotation calculator and output a control signal by making a comparison between the at least one rotated vector and a target value,
a drive-power adjuster configured to receive the control signal from the controller and feedback the control signal to the rotation detectors in the form of a drive power signal that brings the amplitude of the detection signals to a target amplitude,
a corrector configured to correct the amplitude of the detection signals based on the control signal and output a corrected detection signal, and
a rotation angle detector configured to detect a rotation angle of the rotor based on the corrected detection signal.

8. A rotation-angle detection method for detecting a rotation angle of a rotor, the rotation-angle detection method comprising:
performing rotation calculation to output a rotated vector by rotating a vector expressed by two or more detection signals as differential signal pairs directly detected by and output from plural rotation detectors attached to the rotor and configured and arranged to output from each of the plural rotation detectors, the detection signals varying sinusoidally with the rotation angle of the rotor and differing from each other in phase, and amplitude of the detection signals varying with magnitude of drive power to the rotation detectors;
generating two vector signals from the detection signals and outputting the generated signals;
receiving the two vector signals and performing rotation conversion of a vector expressed by the generated signals and outputting the rotated vectors;
receiving at least one rotated vector and outputting a control signal by making a comparison between the at least one rotated vector and a target value;
receiving the control signal and feeding back the control signal in the form of a drive power signal that brings the amplitude of the detection signals to a target amplitude;
correcting the amplitude of the detection signals based on the control signal and outputting a corrected detection signal; and
detecting a rotation angle of the rotor based on the corrected detection signal.

9. The rotation-angle detection device according to claim 1, wherein the corrector is further configured to compare the control signal to an upper limit value of the drive power signal and output a limit detection signal based on the comparison to a difference calculator between the plural rotation detectors and the rotation calculator.

10. The image processing apparatus according to claim 7, wherein the corrector is further configured to compare the control signal to an upper limit value of the drive power signal and output a limit detection signal based on the comparison to a difference calculator between the plural rotation detectors and the rotation calculator.

11. The rotation-angle detection method according to claim 8, further comprising comparing the control signal to an upper limit value of the drive power signal and outputting a limit detection signal based on the comparison.

12. The image processing apparatus according to claim 7, wherein the image processing apparatus is a multi-function printer.

13. The rotation-angle detection device according to claim 1, wherein the angle detector is further configured to output data values corresponding to a detected angle to a memory.

14. The rotation-angle detection device according to claim 4, wherein
the vector generator is configured to generate a vector expressed by the detection signals based on at least two of the differences calculated by the difference calculator and output the vector to the rotation calculator, wherein the difference calculator includes the amplitude adjuster, the amplitude adjuster adjusting the amplitude of the detection signals by multiplying the detection signals by the gain when the difference calculator calculates the differences between the detection signal pairs.

* * * * *